April 30, 1935.  G. C. PAXTON  1,999,574
SIZER
Filed Sept. 26, 1934  2 Sheets-Sheet 1
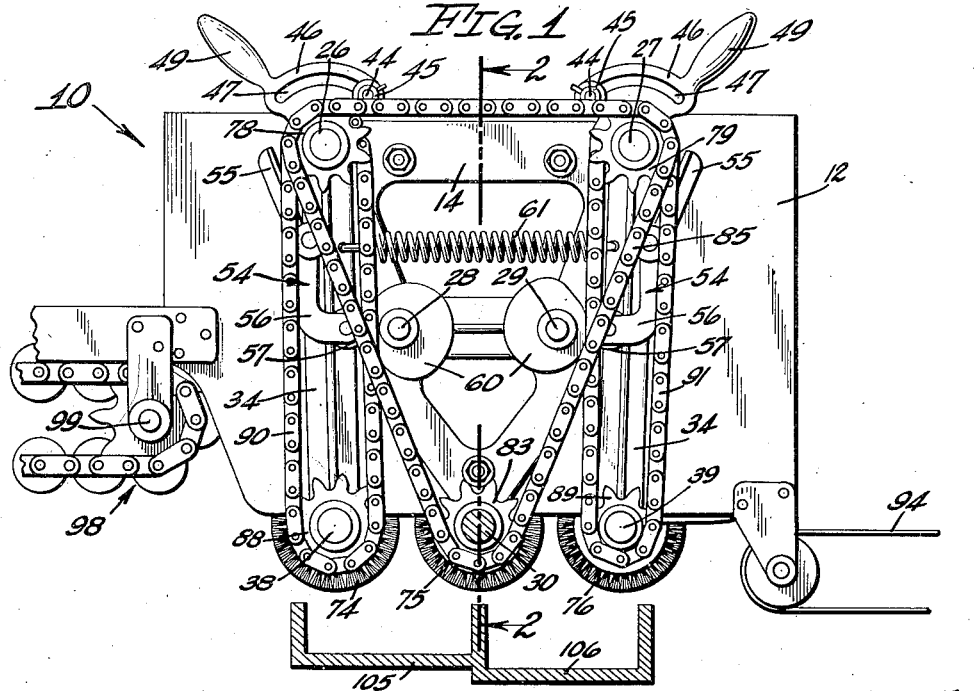
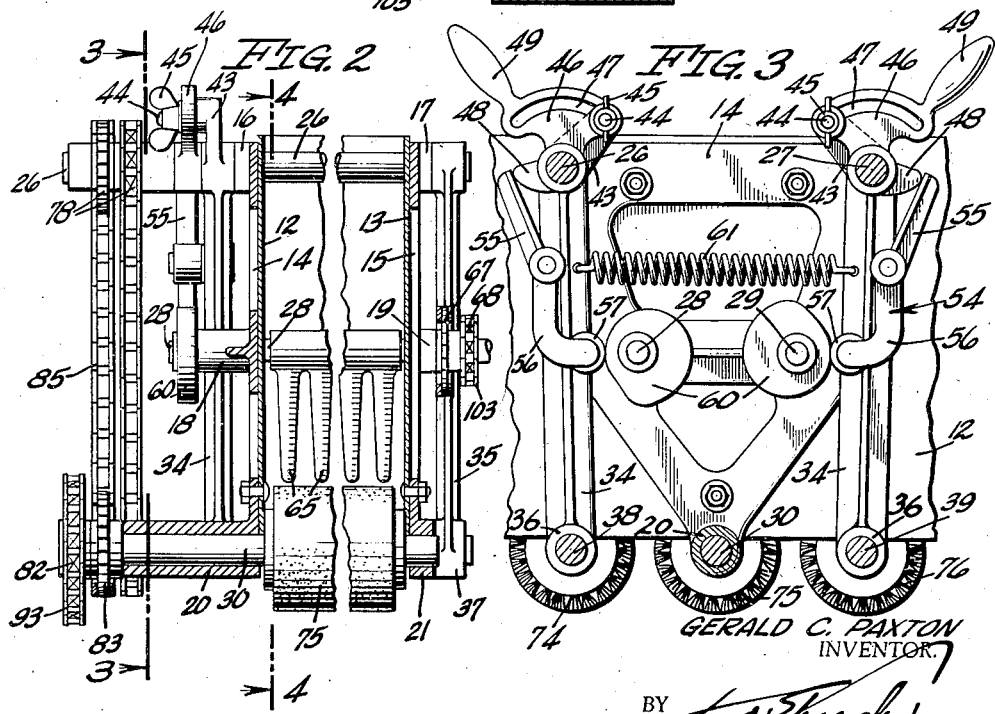
GERALD C. PAXTON
INVENTOR.
BY 
ATTORNEY April 30, 1935.　　　　G. C. PAXTON　　　　1,999,574
SIZER
Filed Sept. 26, 1934　　　2 Sheets-Sheet 2

GERALD C. PAXTON
INVENTOR
BY
ATTORNEY

Patented Apr. 30, 1935

1,999,574

UNITED STATES PATENT OFFICE 1,999,574

SIZER

Gerald C. Paxton, Santa Ana, Calif., assignor to Paxton Credit Corporation, Santa Ana, Calif., a corporation of California Application September 26, 1934, Serial No. 745,543

6 Claims. (Cl. 209—106)

My invention relates to devices for sizing rotatable objects and has particular utility in the fresh fruit packing industry for sizing oranges, lemons, apples, and the like.

The principal object of this device is to provide a sizer which has a relatively large capacity.

A further object is to provide a sizer which is not only fast but accurate in sizing.

A still further object is to provide a sizer that not only has large capacity and accuracy but which handles the fruit gently and thus eliminates bruises which decrease the marketable value of the fruit.

The manner of accomplishing the foregoing objects as well as further objects and advantages will be made manifest in the following description taken in connection with the accompanying drawings, in which:

Fig. 1 is a side elevational view of a preferred embodiment of my invention.

Fig. 2 is a fragmentary transverse sectional view taken on the line 2—2 of Fig. 1.

Fig. 3 is a fragmentary vertical sectional view taken on the line 3—3 of Fig. 2.

Figure 4:
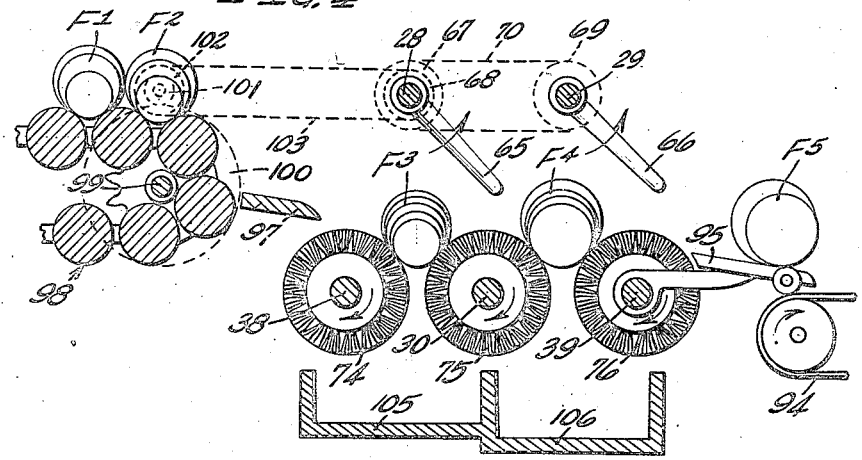
Fig. 4 is a diagrammatic cross-sectional view taken on the line 4—4 of Fig. 2 and illustrating one phase of the operation of the invention in which the rollers are disposed close together, just following the feeding of fruit to the first sizing trough.

Referring specifically to the drawings, the numeral 10 is used to designate generally the sizer illustrated therein. This machine includes base frame plates 12 and 13 which have secured upon other faces thereof cast frame members 14 and 15, respectively. These frame members have swing shaft bearings 16 and 17, respectively, cam shaft bearings 18 and 19, and stationary roller bearings 20 and 21, respectively.

Journalled in the bearings 16 and 17 are swing shafts 26 and 27, journaled in bearings 18 and 19 are cam shafts 28 and 29, and journaled in bearings 20 and 21 is a fixed roller shaft 30.

Fixed upon the front ends of shafts 26 and 27 are swing arms 34 and upon the rear ends of these shafts are fixed swing arms 35. The lower ends of the swing arms 34 and 35 have bearings 36 and 37, respectively. Journalled in the bearings 36 and 37 are swing roller shafts 38 and 39. The swing arms 35 are preferably alike and the swing arms 34 are alike excepting that one is right-hand and the other is left-hand as indicated in Fig. 3. Each of the arms 34 has an adjusting screw lug 43 extending upwardly and inwardly from the hub thereof. Extending forwardly from each of the lugs 43 is a screw 44 adapted to receive a wing nut 45. Freely rotatable on the shafts 26 and 27 are adjusting cams 46 having quadrant slots 47 through which the screws 44 extend to permit the wing nut 45 to lock the cams 46 in any desired position relative to the lugs 43 within the range of the slots 47. Each of the cams 46 has a cam horn 48 and a handle 49, these cams being placed over the shafts 26 and 27 in reversed positions as clearly seen in Figs. 1 and 3. Pivotally mounted on each of the arms 34 is a cam rocker 54, these being in reversed positions so that upper arms 55 of these extend outwardly adjacent the cam horns 48 and the lower arms 56 both extend inwardly and there support rollers 57.

Fixed upon the front ends of the shafts 28 and 29 are cams 60, against the outer surfaces of which the rollers 57 are maintained in contact by a contractile spring 61, opposite ends of which are connected to the arms 34 as clearly shown in Figs. 1 and 3. Fixed on the shafts 28 and 29 between the frame plates 12 and 13 are rubber finger clean-out members 65 and 66. Fixed on the rear end of the shaft 28 is a hub carrying sprockets 67 and 68. Mounted on the rear end of the shaft 29 is a sprocket 69 which is connected with the sprocket 67 by a chain 70, as indicated diagrammatically in Fig. 4. The purpose of the sprocket 68 will be made manifest hereinafter.

Fixed upon the shafts 38, 30, and 39, respectively, are sizing rollers 74, 75, and 76, these rollers being preferably equipped with brush bristles on their peripheries and are preferably of the same diameter.

Freely rotatable on shafts 26 and 27 are double ten-tooth sprockets 78 and 79. Fixed on the front end of the shaft 30 is a driven sprocket 82 and a drive sprocket 83. Chained about the sprocket 83 and the front wheels of the sprockets 78 and 79 is a chain 85. Aligned with the rear wheels of the sprockets 78 and 79 and fixed upon the shafts 38 and 39, respectively, are an eleven-tooth sprocket 88 and an eight-tooth sprocket 89 these last mentioned sprockets being connected by chains 90 and 91, respectively to the rear wheels of double sprockets 78 and 79. The sprocket 82 is connected by a chain 93 to a sprocket (not shown) of any source of rotary power. By the sprocket and chain system thus employed it is seen that the roller 74 is rotated at a slightly slower speed than the roller 75, whereas the roller 76 is rotated at a faster speed than the roller 75.

Figure 5:
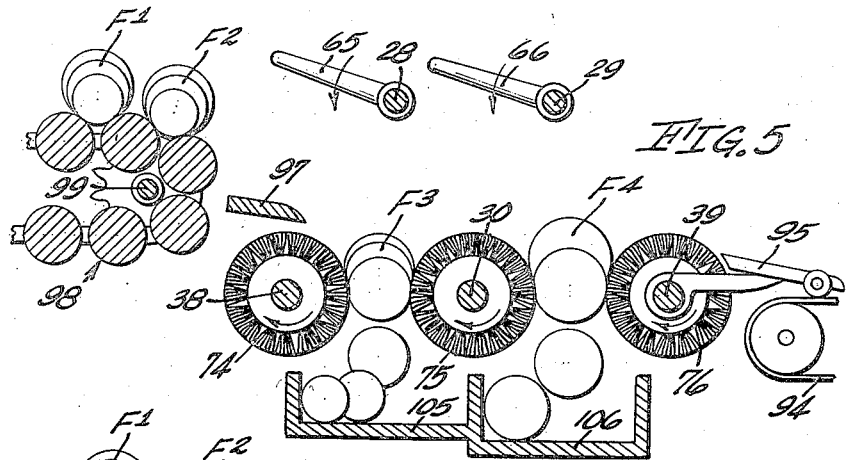
Fig. 5 is a view similar to Fig. 4 illustrating the sizing of the fruit.
Figure 6:
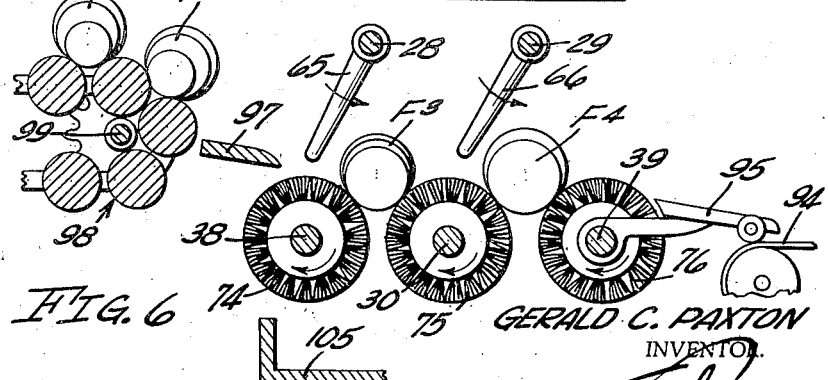
Fig. 6 is a view similar to Fig. 4 illustrating the return of the rollers to closely related positions following the sizing operation.

Positioned for receiving fruit or other rollable objects from the sizer 10 is a discharge conveyor 94, there being a drop board 95 supported on the shaft 39 and on the conveyor 94 as clearly shown in Figs. 4, 5, and 6. Rigidly supported by the frame plates 12 and 13 is a drop board 97 and a roller conveyor 98 supported on and driven by a shaft 99 and which delivers fruit to the drop board 97. The shaft 99 carries a gear 100 diagrammatically shown in Fig. 4, this gear meshing with a pinion 101 which is directly connected axially with a sprocket 102, the sprocket 102 being connected by a chain 103 with the sprocket 68 mounted on the rear end of the shaft 28.

Operation

The shaft 28 is shown as broken off in Fig. 2 at its rear end, this rear end extending back to where it is provided with suitable driven means (not shown) by which this shaft is rotated. The rotation of the shaft 28 times the operation of the sizer 10, actuates the feeding of fruit thereto, the delivery of fruit therefrom, and the sizing of the fruit while it is in the machine. The shaft 28 is rotated, of course, so that the rubber clean-out fingers 65 and 66 swing in the direction of the arrows in Figs. 4, 5, and 6. The conveyor 98 is thus driven from the shaft 28 at such a speed that a row of fruit is fed to the sizer 10 just as the clean-out members 65 and 66 reach their lowermost positions. To explain the operation of the machine, the rows of fruit shown therein in Figs. 4, 5, and 6 will be identified as rows $F^1$, $F^2$, $F^3$, $F^4$, and $F^5$.

In Fig. 4 row $F^5$ has just been delivered by the clean-out fingers 66 onto the drop board 95, row $F^4$ has just been delivered into the trough between the rollers 75 and 76 by the clean-out fingers 65, and the row $F^3$ has just been delivered into the trough between the rollers 74 and 75 by the conveyor 98. Throughout the operation, of course, the sizer rollers 74, 75, and 76 are constantly rotating at a fairly high speed.

It will be noted that the rows $F^1$, $F^2$, and $F^3$ have fruit varying widely in diameter, whereas all the fruit up to a certain diameter has been eliminated from row $F^4$ and all the fruit up to a still larger diameter has been eliminated from the row $F^5$. This is because rows $F^1$, $F^2$, and $F^3$ have not yet been sized in the machine 10 but row $F^4$ has been sized once and row $F^5$ two times.

When the rollers 74, 75, and 76 are positioned as shown in Fig. 4 the cams 60 are as shown in Figs. 1 and 3, and as the shafts 28 and 29 continue to rotate these cams engage the rollers 57 and swing the arms 34 outwardly to increase the spacings between the roller 75 and the rollers 74 and 76. As shown in Figs. 4 and 6, the roller 76 is spaced farther from the roller 75 than the roller 74 is spaced. This is due to adjustment effected by means of rotating one or both of the adjustment cams 46 on their respective shafts 26 and 27. This relative spacing of the rollers 74 and 76 from the roller 75 when the outer rollers are in their inwardmost positions is significant as each rotation of the cams 60 merely moves the rollers 74 and 76 outwardly given distances from their inwardmost positions and then returns these to their inwardmost positions. It is thus seen that whatever the inwardmost positions of the rollers 74 and 76 are before they are swung outwardly determines the spacing from the roller 75 which they will have in their outwardmost positions. This spacing determines the sizes of fruit which will be permitted to drop between the roller 75 and the outer rollers 74 and 76.

Fig. 5 illustrates the result of the rollers 74 and 76 being spread laterally from the roller 75, this spreading permitting all sizes of fruit in row $F^3$ which are smaller than the spacing of rollers 74 and 75 to drop downwardly into a suitable chute 105 disposed therebeneath for receiving this sized fruit. On the other hand, all pieces of fruit in row $F^4$ smaller than the spacing of the rollers 75 and 76 drop down into a chute 106 provided to receive this. The fruit is thus segregated into different sizes, one group going in the chute 105 and the other group in the chute 106 and the third group passing over the drop board 95 onto the discharge conveyor 94.

When the rollers 74 and 76 start to swing inwardly from their outermost position, as shown in Fig. 5, the lowermost pieces of fruit in each of the rows $F^3$ and $F^4$ are disposed almost directly between the rollers. Owing to the rollers 75 rotating at a greater speed than the roller 74, however, and likewise the roller 76 at a greater speed than the roller 75, these lowermost pieces of fruit in rows $F^3$ and $F^4$ are lifted up as the rollers come together without any damage to the fruit. Thus, the rollers 74 and 76 are quickly returned to their close order position as shown in Fig. 6 and the rows $F^3$ and $F^4$ are assembled in elevated position ready to be engaged by the clean-out fingers 65 and 66 to discharge the row $F^4$ onto the discharge conveyor 94 and push the row $F^3$ over into the trough between the rollers 75 and 76. As this is done, of course, the row $F^2$ will be discharged by the feed conveyor 98 into the first sizing trough from which the row $F^3$ will just have been removed.

What I claim is:

1. In combination: a pair of parallel sizing rollers spaced to form a trough; means for rotating said rollers in a common direction and at unequal peripheral speeds, that roller the surface of which rises adjacent said trough having the greater peripheral speed; means for feeding rows of rollable bodies successively into said trough; means for increasing the spacing of said rollers while each such row is resting in said trough to permit such articles, as are of less diameter than said increased spacing, to pass between said rollers and then to decrease said spacing to its original extent; and means to remove the articles remaining in said trough at the conclusion of the aforesaid cycle of operation.

2. In combination: a frame; a pair of parallel sizing members, one of which has a fixed position on said frame, said members cooperating to form a sizing trough; means for rotating one of said members so that the surface thereof adjacent said trough rises upwardly; means for shifting one of said members away from and towards the other; means for removing a row of rollable articles from said trough immediately following each return of said members towards each other; and means for feeding a fresh row of such articles to said trough immediately following the removal of articles therefrom by the last aforementioned means.

3. A combination as in claim 2 in which said row removing means includes a rotary member mounted on said frame for engaging articles and displacing them from said trough, said rotary member being operated in timely relation with said article feeding means.

4. A combination as in claim 2 in which said row removing means includes a rotary member mounted on said frame directly above said trough on a fixed axis for engaging articles and displacing them from said trough, said rotary member being operated in timely relation with said article feeding means.

5. In combination: a frame; a roller mounted thereon; a second roller mounted on said frame for cyclic movement relative to said first roller to form a sizing trough having a sizing opening varying in width; means to feed articles to said trough; and means for lifting articles from said trough, the last two means being operative as stated in timed relation to each other and at the closest approach of said rollers during each cycle of movement of said second roller.

6. A combination as in claim 5 in which means is provided for rotating said rollers so that the net effect of contact of said rollers with an article resting in said trough is to lift said article upward.

GERALD C. PAXTON.